United States Patent Office

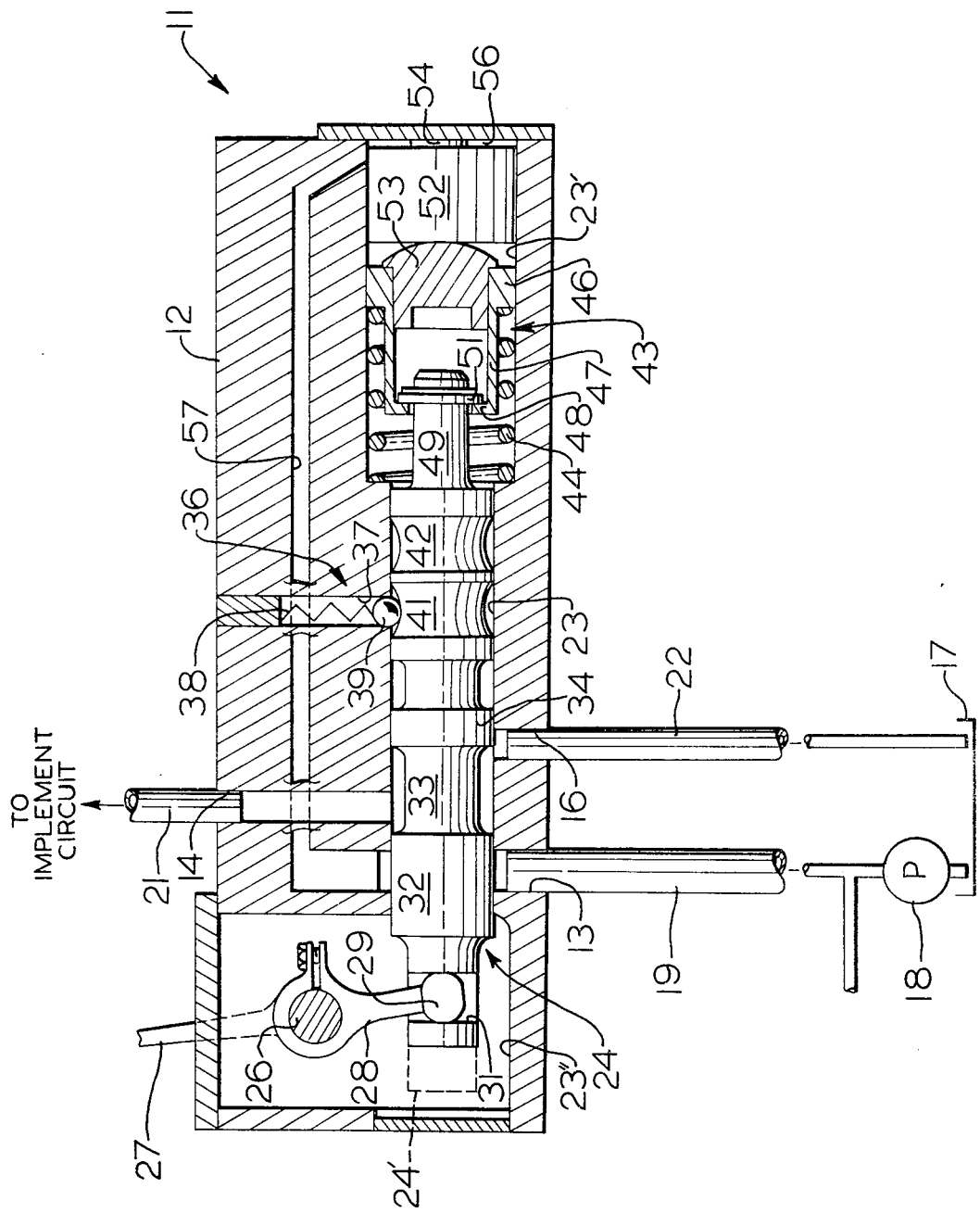

3,511,276
Patented May 12, 1970

1

3,511,276
FLUID CONTROL VALVE WITH CONDITIONAL SELF-ACTUATING MEANS
Henry J. Jessen, Manhattan, Ill., and Roger A. Rice, Joliet, Ill., assignors to Caterpillar Tractor Co., Peoria, Ill., a corporation of California
Filed Apr. 4, 1968, Ser. No. 718,683
Int. Cl. F16k 11/02, 31/143
U.S. Cl. 137—624.27                              5 Claims

ABSTRACT OF THE DISCLOSURE

A detented operator controlled spool valve for selectively actuating a fluid operated mechanism automatically closes itself in the absence of adequate fluid pressure for safely operating the mechanism. The normal fluid pressure in the valve compresses a spring which, in the absence of adequate pressure, can override the detents and force the spool to the closed position.

BACKGROUND OF THE INVENTION

This invention relates to valves and more particularly to a valve for controlling a fluid system which automatically shifts to a preferred position in the absence of adequate fluid pressure for operating the associated system.

Most fluid driven systems include a control valve which is operated to activate and inactivate the system or to select a particular one of several possible modes of operation. For safety purposes, for operating efficiency, or for any of diverse other reasons, it is often desirable that such a control valve be shifted to a specific one of its several positions in the event that the fluid pressure in the system drops below a preferred operating level.

One example of a fluid system which is subject to this condition is a cushion hitch for coupling the tractor and the scraper body of a tractor-scraper of the type used to move earth. Such a cushion hitch is described in detail in United States Pat. 3,311,389 of J. C. Barton, et al., issued Mar. 28, 1967 for System for Control of Pitch and Bounce in Tractor-Trailer Combinations.

A cushion hitch provides a coupling in which unwanted motions of one component of the tractor-scraper combination, resulting from terrain irregularities or other causes, are dampened rather than being wholly transmitted to the other component. The system is operated in part by hydraulic fluid under pressure and includes an operator's control valve. By means of the control valve, the operator may actuate the cushion hitch by applying fluid under pressure thereto and may inactivate the hitch, to provide a more conventional coupling action between the tractor and scraper body, by blocking the fluid under pressure from the hitch while venting the system to a fluid reservoir.

For safety reasons, it is important that the control valve be at the latter position, i.e., that the pressurized fluid be blocked from the hitch and that the hitch be vented, any time that the fluid pressure drops below the normal operating level. Such an underpressure condition is of course present when the engine and pump which supplies the fluid is off or may result from various other causes such as a rupture of fluid conduits or the like. There are various reasons why the high pressure should be relieved from the cushion hitch at such times. If, for example, the system were opened at some point or other for servicing purposes with high pressure present serious injury could result. Further, it is generally desirable to lower the scraper cutting edge when the machine is parked to prevent the apparatus from rolling forward or back-

2 ward and this cannot be done with an activated cushion hitch. Still further if the control valve were open when the operator first starts the machine, pump pressure could activate the cushion hitch prematurely thereby raising the scraper bowl and possibly allowing the machine to roll.

Accordingly, it is extremely important that the control valve of a cushion hitch be at the closed position any time that normal operating fluid pressure is not being supplied to the valve. The cushion hitch is one example of a fluid system wherein such a requirement is present there being many other forms of fluid operated systems in which a similar condition obtains. Heretofore such systems have depended upon the operator to make the necessary valve adjustments at the appropriate times.

SUMMARY OF THE INVENTION

This invention is a control valve for a fluid system which automatically shifts itself to a preferred position in the absence of adequate fluid pressure within the valve. For this purpose, means are provided which are capable of forcing the valve to the preferred position but which are normally prevented from doing so by the force of the fluid pressure when the pressure is at or above the predetermined minimum value.

Accordingly it is an object of this invention to provide a fluid control valve which automatically assumes a preferred setting in the absence of a predetermined level of fluid pressure but which may be shifted to any selected setting in the presence of adequate fluid pressure.

The invention together with further objects and advantages thereof will best be understood by reference to the following description of a preferred embodiment taken in conjunction with the accompanying drawing.

BRIEF DESCRIPTION OF THE DRAWING

The accompanying drawing is an axial section view of a fluid control valve in accordance with the invention with certain associated components being shown schematically.

DESCRIPTION OF A PREFERRED EMBODIMENT

Referring now to the drawing, the fluid control valve 11 of this example is of the type having a valve body 12 with an inlet passage 13 for fluid under pressure, an outlet passage 14 for supplying the pressurized fluid to a fluid operated system associated with the valve, and a vent passage 16. As will hereinafter be described in more detail, this particular valve 11 is of the type having two positions including an open position at which pressurized fluid inlet 13 is communicated with outlet 14 and having a closed position at which the pressurized fluid inlet 13 is blocked while the outlet 14 is vented through outlet 16. This is the mode of valving action required to operate a cushion hitch for a tractor-scraper as hereinbefore described however it will be apparent that the invention is equally applicable to valves having a variety of different positions and forming a variety of different fluid paths at the several settings thereof. In the particular valve application of this example, fluid under pressure is supplied to inlet passage 13 from a suitable reservoir 17 through a pump 18 and inlet conduit 19. A conduit 21 at outlet passage 14 delivers fluid under pressure to the system associated with the control valve and an additional conduit 22 connects vent passage 16 with the reservoir 17 to return fluid thereto.

Valve body 12 has a stepped bore 23 with an enlarged diameter region 23' at one end and an actuator chamber 23" at the other end. An annular valve spool 24 is disposed coaxially within bore 23 and is movable in an axial direction therein between two positions. To enable an operator to shift the spool 24 between the two positions a pivot shaft 26 transpierces chamber 23" and a lever 27 extends in a radial direction therefrom outside the valve body 12. Depending on the placement of the valve 11 relative to the operator, lever 27 may itself be a control lever or may be a component of linkage which connects with an operator's control level at a remote location.

Within chamber 23" a crank arm 28 projects radially from pivot shaft 26 and has a ball element 29 situated within a diametrical slot 31 in the adjacent end of spool 24. Thus by pivoting the lever 27, the spool 24 may be shifted axially between the position shown and a second position indicated by dash lines 24'.

Valve spool 24 carries a land 32 positioned to block the pressurized fluid inlet passage 13 when the valve is at the closed position. At this position a reduced diameter portion 33 of the spool communicates outlet 14 with vent outlet 16. At the shifted or open position of the valve 11, as indicated by dash lines 24', reduced diameter spool portion 33 communicates inlet passage 13 with outlet passage 14 while an adjacent second land 34 on the spool blocks communication between outlet 14 and the vent outlet 16.

A detent mechanism 36 is situated within valve body 12 to aid in locating and holding the selected position of spool 24. The detent mechanism 36 may be situated within a closed passage 37 in the valve body which is directed radially with respect to bore 23 and which opens thereat. A compression spring 38 is situated in passage 37 and acts against a ball detent element 39 causing the ball to bear against the adjacent portion of the spool 24. Spool 24 has a pair of annular grooves 41 and 42 of arcuate profile each being located on the spool to be adjacent the detent ball 39 at a separate one of the two positions of the spool. The effect of the spring biased ball 39 acting in a radial direction against the arcuate grooves 41 and 42 is to tend to pull the spool toward the preferred longitudinal positions within bore 23 and thus to impart a feel to control lever 27 which aids the operator in manipulating the valve between the two positions. The detent mechanism 36 has the further effect of tending to hold the spool 24 at a selected one of the positions thereof although the spool can of course be moved by applying sufficient force to the control lever 27.

As hereinbefore discussed, it is generally desirable in a control valve of this kind that the valve be at a specific one of the several possible settings in the event that the pump 18 is not operating or if there is less than normal fluid pressure at inlet 13 for some other reason. In the valve 11 of this example, the desired valve position under this condition is the closed position at which inlet 13 is blocked. Automatic means 43 are situated in bore section 23' for shifting the valve to this position under a low pressure condition if it is not already at such position.

In particular, a compression spring 44 is disposed coaxially in bore section 23' and one end of the spring abuts against a flange 46 on a slidable cylindrical sleeve 47 which is also situated within the bore section in coaxial relationship therewith. The end of sleeve 47 closest to spool 24 has a lip 48 directed radially inward. Lip 48 extends into a reduced diameter portion 49 at the adjacent end of spool 24. The outer end of reduced diameter portion 49 of the spool is defined by terminal flange 51. The lip 48 of sleeve 47 and the flange 51 of spool 24 are positioned longitudinally to provide for abutment of the flange against the lip when the spool 24 is at the hereinbefore described closed position blocking inlet passage 13 with the spring 44 being relaxed. Thus under this condition the spring 44 tends to hold the spool 24 at the closed position of the valve inasmuch as shifting of the valve spool to position 24' results in compression of spring 44 which then exerts a pull on the valve spool through lip 48 and flange 51 tending to return the spool to the closed position. The force of spring 44 on the valve spool 24 is greater than the force of the detent mechanism 36 which tends to resist spool movement so that the valve will always return to the closed position irrespective of the detent except when some additional means holds the spring 44 in a compressed state. Such means is provided by a piston 52 slidably disposed in bore section 23 to bear against a button 53 at the adjacent end of sleeve 47. Piston 52 has a short axial projection 54 at the end opposite from button 53 to provide a small clearance space 56 at the end of bore section 23' irrespective of the position of the piston therein. Clearance space 56 is communicated, by a passage 57 in valve body 12, with fluid inlet 13. Thus the fluid pressure at inlet 13 acts against the piston 52 in a direction tending to compress the spring 44.

In operation the pressure of the fluid at inlet 13 is transmitted to piston 52 and maintains spring 44 compressed as long as the pressure is at or above a predetermined level. As long as spring 44 remains in its compressed state, control lever 27 may be utilized to shift the valve 11 between the two described positions thereof as desired with the detent mechanism 38 acting to hold the valve spool 24 at the selected position. However if the pressure of the fluid at inlet 13 drops below the predetermined level for any reason spring 44 is able to overcome the force of the piston 52 and then expands. If the valve spool 24 is in the open position 24' at the time spring 44 expands, lip 48 engages flange 51 to pull the valve spool into the closed position and hold it there. If the valve spool 24 is already in the closed position at the time the pressure at inlet 13 is inadequate to hold the spring compresesd, expansion of the spring does not move the valve spool but does prevent the spool from being shifted and detented into the open position as long as the low pressure condition remains. It should be noted that the operator can override the self-actuating action provided by means 43 by forcibly holding the control lever 24 if he deems it desirable but he cannot leave the valve detented in the open position as long as the low pressure condition persists. Once he releases the control lever 11, spring 44 will restore the valve to the closed position.

What is claimed is:
1. A valve comprising:
   a valve body having an inlet for fluid under pressure and having at least one fluid outlet;
   a movable valve member disposed within said body and having a plurality of positions wherein said valve member directs fluid from said inlet to said outlet at one of said positions and blocks fluid flow from said inlet to said outlet at another of said positions;
   resilient means urging said valve member toward a predetermined one of said positions thereof, and
   means for directing the force of said fluid under pressure against said resilient means to disengage said resilient means from said valve member whereby said resilient means is prevented from acting on said valve member to force said valve member to said predetermined position thereof except when said fluid pressure is below a predetermined value.

2. A valve as defined in claim 1 further comprising a detent acting on said valve member to hold said valve member at a selected one of said positions thereof, said resilient means being capable of overcoming said detent.

3. A valve as defined in claim 1 wherein said resilient means urges said valve member toward said position thereof at which said fluid flow is blocked from said outlet of said valve body.

4. A valve as defined in claim 1 wherein said valve body has a bore with which said inlet and said outlet are communicated at spaced apart regions thereon, and wherein said valve member is a spool disposed coaxially in said bore and movable in an axial direction therein, and wherein said resilient means is a spring disposed to engage said spool to urge said spool toward said predetermined position thereof, said means for directing the pressure of said fluid against said resilient means being a movable piston having a first portion exposed to said fluid from said inlet and having a second portion acting on said spring for disengaging said spring from said spool while said pressure exceeds said predetermined value.

5. A valve as defined in claim 4 further comprising a detent element within said valve body in contact with said spool, second resilient means acting on said detent element to urge said element against said spool to resist axial movement thereof, and wherein the force exerted on said spool by said spring is capable of overcoming said resistance to axial movement of said spool which results from the force of said detent element thereon.

References Cited
UNITED STATES PATENTS

| | | | |
|---|---|---|---|
| 2,443,568 | 6/1948 | Palm | 91—337 |
| 2,689,585 | 9/1954 | Presnell | 91—426 XR |
| 2,864,402 | 12/1958 | Presnell | 91—426 XR |
| 2,989,989 | 6/1961 | Whaley et al. | 137—625.69 |
| 3,176,722 | 4/1965 | Spokas | 137—625.69 |

M. CARY NELSON, Primary Examiner

R. J. MILLER, Assistant Examiner

U.S. Cl. X.R.

157—625.69